July 29, 1969 W. E. ALTMANN 3,457,807
SELF-LOCKING DIFFERENTIAL GEAR, ESPECIALLY FOR MOTOR VEHICLES
Filed May 1, 1967 2 Sheets-Sheet 1

INVENTOR
WERNER E. ALTMANN
BY
ATTORNEYS

July 29, 1969     W. E. ALTMANN     3,457,807

SELF-LOCKING DIFFERENTIAL GEAR, ESPECIALLY FOR MOTOR VEHICLES

Filed May 1, 1967     2 Sheets-Sheet 2

INVENTOR
WERNER E. ALTMANN

BY *Decker + Craig*
ATTORNEYS

United States Patent Office 3,457,807.
Patented July 29, 1969

3,457,807
SELF-LOCKING DIFFERENTIAL GEAR,
ESPECIALLY FOR MOTOR VEHICLES
Werner E. Altmann, Stuttgart, Germany, assignor to
Daimler-Benz Aktiengesellschaft, Stuttgart-Unter-
turkheim, Germany
Filed May 1, 1967, Ser. No. 635,053
Claims priority, application Germany, May 5, 1966,
D 50,044
Int. Cl. F16h 1/44
U.S. Cl. 74—711                11 Claims

ABSTRACT OF THE DISCLOSURE

A differential gear for vehicles, especially motor vehicles, which comprises a differential gear housing operatively connected with the drive, a differential spider in and rotating with the housing on which are mounted freely rotatably the differential bevel gears which mesh with the output bevel gears; the latter are connected by way of inclined surfaces with flange-like parts splined to the output shafts; disengageable clutches are provided between a respective output bevel gear and the differential gear housing and springs are provided normally keeping the disengageable clutches engaged whereby the clutches are disengaged in effect by the axial thrust resulting from the inclined surfaces during transmission of torque.

Background of the invention

The present invention relates to a self-locking differential gear for vehicles, especially a bevel wheel differential gear for motor vehicles in which a housing operatively connected with the drive accommodates the differential gears on bolts rotating in unison with the housing, and in which the output gear wheels, which engage with differential gears, are adapted, on the one hand, to be connected with the housing by a disengageable friction clutch and, on the other, are operatively connected with the respective output or driven shafts by means of inclined surfaces, whereby the axial thrust resulting from the inclined surfaces during transmission of torque serves for the disengagement of the clutch.

With a known differential gear of the aforementioned type, cone clutches are used as friction clutches. These cone clutches are splined or mounted by a toothed arrangement on the output bevel gears. During the transmission of torque, the tooth pressure, on the one hand, and the axial thrust produced at the inclined surfaces, on the other, act by way of the output bevel gears on these prior art cone clutches. Both output bevel gears are connected with each other by a web so that the force interplay at one output bevel gear, i.e., also at the cone clutch associated therewith, is transmitted to the other side.

These known prior art gears have the disadvantage that for purposes of engagement of the cone clutches, the transmission of a torque is a prerequisite. For without such a torque transmission, the clutches are not engaged. Consequently, it is not possible with such prior art differential gears to start on ice. Furthermore, the locking of this gear can be solved completely satisfactorily only if the same torques are transmitted at both output bevel gears. When driving through a curve, a completely satisfactory disengagement of the cone clutches does not occur as the torque on the one side precludes the disengagement of the clutch on the other side.

Summary of the invention

The present invention aims at eliminating the aforementioned disadvantages. The underlying problems are solved according to the present invention with the aforementioned differential gears in that each output gear wheel is operatively connected by itself exclusively with the clutch coordinated thereto and in that each clutch is closed or engaged by a spring force. In other words, the inventive concept of the present invention resides in coordinating to each side of the differential gear a clutch operative and effective by itself which is kept engaged by a spring force and opens or disengages only during the transmission of torque. A transmission of the force interplay from the one to the other side is thereby excluded. This has a consequence that starting on ice is also possible without any difficulties with the differential gear according to the present invention because the locking clutches are kept closed or engaged by the spring force. Furthermore, a completely satisfactory disengagement of both clutches occurs when driving through a curve since each output bevel gear by itself disengages the associated clutch during transmission of torque—irrespective where this torque is initiated.

Differential gears are known in the prior art—as, for example, the aforementioned differential gear—having output bevel gears which are connected on the back side thereof by inclined surfaces with a flange-like part whose hub is non-rotatably arranged on the respective output shaft so as to rotate in unison therewith. In connection with such differential gears, the present invention proposes that a cup spring is arranged between each output bevel gear and the spider accommodating the differential gears which cup spring presses the corresponding output bevel gear in the direction toward the flange-like part. Appropriately, the cup spring is thereby supported against the spider by means of axially effective roller bearings.

Self-locking differential gears of a different type are also known in which lamellae friction clutches are provided as locking clutches. Such lamellae friction clutches can also be used with the differential gear according to the present invention. The present invention proposes therefor in particular that these lamellae friction clutches are arranged between the flange-like part effective as abutment and the output bevel gear acting with its back side as pressure plate or accommodating the same. It is then appropriate with such constructions if the sets of lamellae are arranged approximately concentrically about the inclined surfaces. The output bevel gear is provided advantageously with an extended hub for the accommodation of the lamellae set.

Naturally, also the use of cone friction clutches is possible with the present invention. In such a case, the present invention proposes that each output bevel gear forms itself at the external circumference a conical surface for the abutment at a corresponding counter surface in the housing.

With another type of construction according to the present invention, a cup spring is arranged between each flange-like part and the housing which presses the flange-like part in the direction toward the output bevel gear. In this case, the flange-like part therefore acts as pressure plate and the bevel gear acts as abutment, so to speak of. Of course, the use of cone or lamellae friction clutches is also possible with such construction. The bevel gear is again supported on the spider, and more particularly either directly or by way of the differential bevel gear. Also in this case, it is appropriate if the spring is supported by means of an axial bearing against the housing.

The construction of the inclined surface itself may be realized in any conventional manner as known to a person skilled in the art. However, the present invention prefers a solution pursuant to which the inclined surfaces are constructed as continuous or uninterrupted sinusoidally shaped curved tracks or surfaces. With another construction of the present invention, pocket-shaped recesses having balls or other roller bodies therein are provided as inclined surfaces at both parts. Naturally, it is also possible to insert roller bodies between the sinusoidally curved tracks or surfaces.

Accordingly, it is an object of the present invention to provide a self-locking differential gear of the type described above which eliminates by simple means the aforementioned drawbacks and shortcomings encountered with the prior art constructions.

Another object of the present invention resides in a self-locking differential gear in which the engagement of the clutches is not dependent on the transmission of the torque.

A further object of the present invention resides in a self-locking differential gear, especially for motor vehicles, which permits starting on ice without difficulties.

A still further object of the present invention resides in a self-locking differential gear which not only achieves all of the aforementioned objects and features in a completely satisfactory manner but also enables a completely satisfactory disengagement of the clutches when driving through curves.

Another object of the present invention resides in a self-locking differential gear for motor vehicles in which the clutches are each actuatable independently of one another so as to increase versatility of operation and use of the self-locking differential.

Still another object of the present invention resides in a self-locking differential gear which is simple in construction, utilizes relatively few parts and permits assembly and disassembly without great difficulties.

These and other objects, features, and advantages of the present invention will become more obvious from the following description when taken in connection with the accompanying drawing, which shows, for purposes of illustration only, several embodiments in accordance with the present invention, and wherein.

Figure 1:
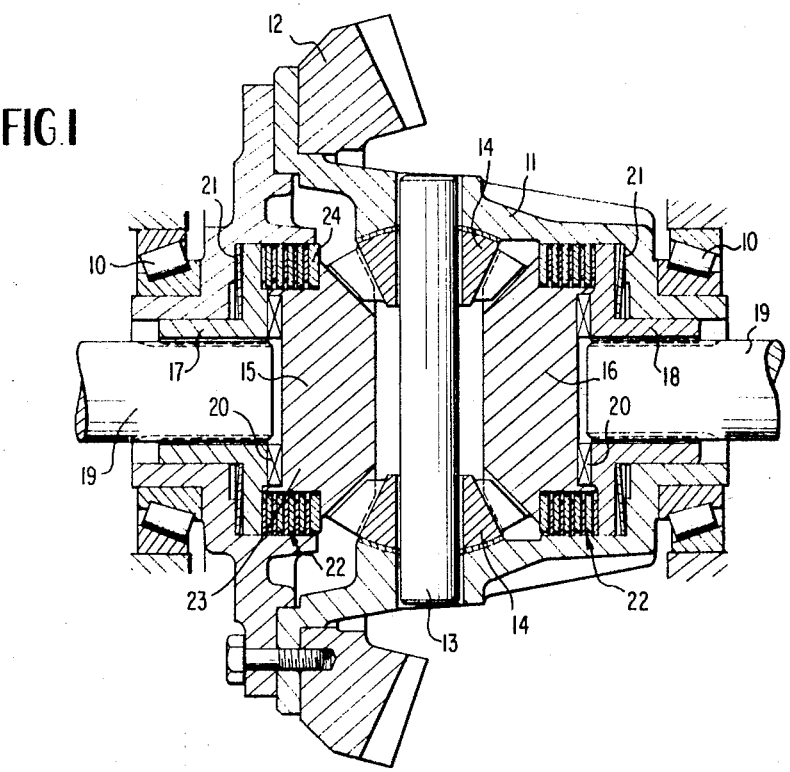
FIGURE 1 is a longitudinal cross-section view through a differential gear in accordance with the present invention.
Figure 4:
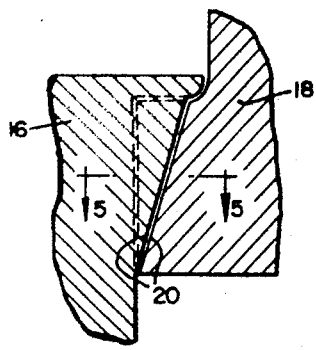
FIGURE 4 is an enlarged fragmentary view of the inclined surfaces 20 shown diagrammatically at FIGURE 1.
Figure 5:
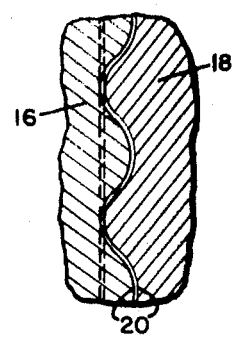
FIGURE 5 is a fragmentary enlarged sectional view taken along line 5—5 of FIGURE 4.

Referring now to the drawing wherein like reference numerals are used throughout the various views to designate like parts, and more particularly to FIGURE 1, the differential gear housing 11 is suitably supported by means of bearings 10 in a conventional axle gear housing, not illustrated in detail herein. The drive bevel gear wheel 12 is suitably secured or fastened to the differential gear housing 11 by any conventional means so as to rotate in unison therewith. The differential gear housing 11 is thus driven from a pinion (not shown) by way of the drive bevel gear wheel 12. The so-called differential spider 13 is supported within the housing 11; the differential spider pinions or bevel gears 14 are freely rotatably supported on the bolt-like spider 13. The differential pinions or bevel gears 14 are in meshing engagement with the output bevel gears 15 and 16 which, in their turn, are operatively connected with the output shafts 19 by way of the flange-like parts 17 and 18. The flange-like parts 17 and 18 are non-rotatably secured by means of spline teeth or the like on the output shafts 19. Inclined surfaces 20 (shown diagrammatically in FIGURE 1 and in detail in FIGURES 4 and 5) which are constructed as continuous sinusoidally shaped curved surfaces and which mesh with one another, are disposed between the flange-like parts 17 and 18 and the output bevel gears 15 and 16. The flange-like parts 17 and 18 are pressed in the direction toward the spider 13 of the differential gear by means of cup springs 21 which are disposed between the flange-like parts 17 and 18 in the housing 11.

Each output bevel gear 15 or 16 is adapted to be connected with the differential gear housing 11 by means of a lamellae clutch generally designated by reference numeral 22. For this purpose, each output bevel gear 15 or 16 is provided with an extended hub portion 23 which is constructed as lamellae carrier or support. The counter-lamellae are secured in a conventional manner within the differential gear housing 11. An abutment 24 is arranged at the back side of the bevel gear 15 and 16 or the abutment may even be formed by the respective output bevel gear itself. The flange-like parts 17 and 18 serve as pressure plates for the clutch 22.

It can be readily seen from FIGURE 1 that the springs 21 keep the clutches 22 continuously engaged by way of the flange-like parts 17 and 18 as pressure plates. As a result thereof, the output bevel gears 15 and 16 are securely connected with the differential gear housing 11. The differential gear is therefore locked as such. It will also be readily seen without difficulty that upon transmission of torque by way of the differential gears an axial thrust occurs at the inclined surfaces 20 which presses back the flange-like parts 17 and 18 into a respective outward direction against the springs 21. As a result thereof, the clutches 22 are disengaged. The differential gear is therewith unlocked. It may be mentioned in this connection that the disengagement and engagement of the clutches do not involve large actuating paths. Rather, it depends essentially on the force interplay whereby the paths to be traversed are minimal.

If during starting, for example, one wheel has no road traction—which occurs very frequently during winter—then this wheel spins and neither of the two wheels can normally transmit any torque with the prior art differential gears. If it is assumed, however, that the wheel coordinated to the output bevel gear 15 of the present invention has no road traction, then no axial thrust can form at the inclined surfaces 20 associated therewith. The spring 21 therefore keeps the clutch 22, disposed on this side, engaged. As a result thereof, the differential gear housing 11 inclusive the output bevel gears 15 and 16 rotates as a unit. Since, however, the right wheel coordinated to the output bevel gear 16 has road traction, an axial thrust may form at the inclined surfaces 20 of this side which disengages the clutch 22 on this side. However, this does not yet lead to an unlocking of the differential gear since the clutch 22 on the other side coordinated to the other output bevel gear 15 remains closed or engaged. This remains the case for such length of time until the left vehicle wheel has no road traction.

If the left wheel also commences again to engage, i.e., has traction, then the axial thrust arising in this case also on this side at the inclined surfaces 20 also disengages thereat the clutch 22. The differential gear is now again unlocked. This unlocked condition remains also while driving through curves. This is so because when driving through a curve, a torque is initiated on the differential gear either in addition to the torque supplied by the engine or exclusively still from the wheels. This torque thereby keeps the respective clutch 22 disengaged on each side, independently from the other side, by the axial thrust occurring at the inclined surfaces 20. The torque of one side therefore cannot cause the clutch on the other side to be engaged as was the case with the prior art differential gears.

Figure 2:
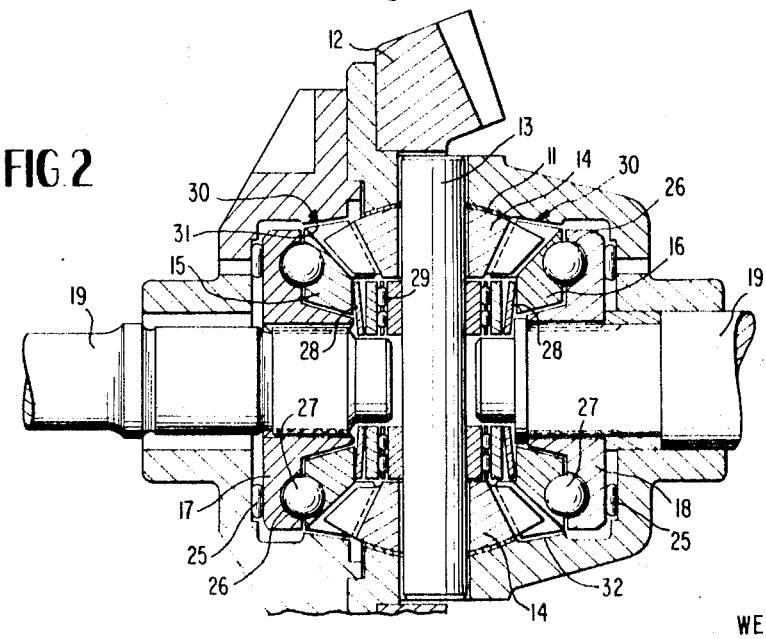
FIGURE 2 is a longitudinal cross-sectional view through a modified embodiment of a differential gear in accordance with the present invention.

FIGURE 2 illustrates a modified differential gear which in its construction and operation is, in principle, identical with that of FIGURE 1.

However, different in this embodiment is the arrangement of the springs and the construction of the inclined surfaces. Thus, for example, the flange-like parts 17 and 18 are now supported on their back side by means of roller bearings 25 with respect to the differential gear housing 11. Pockets 26 distributed uniformly over the circumference are now disposed between the flange-like parts 17 and 18 and the output bevel gears 15 and 16 in which are arranged balls 27. The pockets 26 act in conjunction with the balls 27 as inclined surfaces. Springs 28 are now arranged between the output bevel gears 15 and 16 and the spider 13 of the differential gear. These springs 28 are supported at the spider 13 by way of roller bearings 29. The springs 28 press the output bevel gears 15 and 16 constantly in the direction toward the flange-like parts 17 and 18.

The construction of the clutches of the embodiment of FIGURE 2 also has to be considered as a further difference. Cone friction clutches generally designated by reference numeral 30 are provided between the output bevel gears 15 and 16 and the differential gear housing 11. For this purpose, the output bevel gears 15 and 16 are provided at their outer circumference with conical surfaces 31 which cooperate with corresponding counter surfaces 32 in the housing 11. The operation of this differential gear is—as already mentioned—the same as that with the embodiment according to FIGURE 1.

Figure 3:
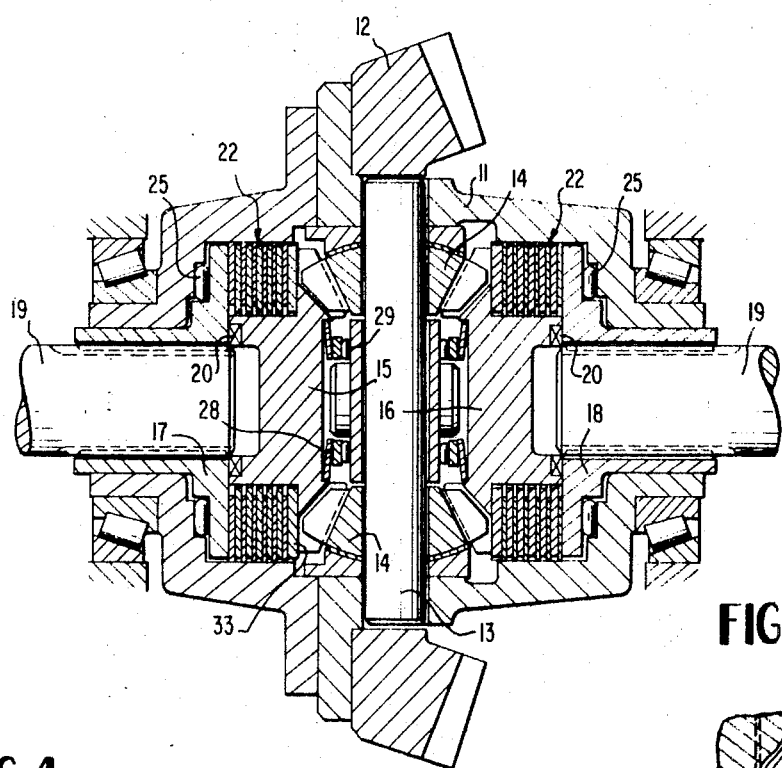
FIGURE 3 is a longitudinal cross-sectional view through a still further modified embodiment in accordance with the present invention.

Also the embodiment according to FIGURE 3 shows in principle the same construction. Lamellae friction clutches generally designated by reference numeral 22 are used again in this embodiment which are provided corresponding to the arrangement according to FIGURE 1. Also, the construction of the flange-like parts 17 and 18 is similar to that in FIGURE 1. However, in contradistinction to the construction of FIGURE 1, the flange-like parts 17 and 18 of FIGURE 3 are supported again with respect to the housing 11 by means of roller bearings 25 on the back side thereof. Thus, the flange-like parts 17 and 18 now act as abutment for the clutches 22. A pressure plate 33 is provided on the back side of the output bevel gears 15 and 16. The output bevel gears 15 and 16 may in this case also act themselves as pressure plates. The output bevel gears 15 and 16 are again supported against the spider 13 by means of a cup spring 28 with the aid of a roller bearing 29. The construction of the inclined surfaces 20 corresponds to that of FIGURE 1.

The operation of the embodiment according to FIGURE 3 is in principle the same as that already described hereinabove. However, it should also be noted that with the embodiments according to FIGURES 2 and 3, the spring force acts in the same direction as the tooth pressure which occurs between the differential gears 14 and the output bevel gears 15 and 16. As a result thereof and by reason of the arrangement of friction clutches with as many lamellae as possible, it is quite feasible to achieve with relatively small springs very large locking values which go beyond the self-locking.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:
1. A self-locking differential gear for vehicles, especially bevel wheel differential gear for motor vehicles, comprising an input, a differential gear housing operatively connected with the input, spider means in said housing and rotating in unison therewith, differential gear means mounted on said spider means, output gear means in said housing meshingly engaging with said differential gear means, disengageable friction clutch means operatively connecting said output gear means with said differential gear housing, output shaft means, connecting means including inclined surface means operatively connecting the output bevel gear means with the respective drive shaft means, the inclined surface means producing, during transmission of torque, an axial thrust serving for the disengagement of the clutch means, each output bevel gear means being operatively connected by itself exclusively with the clutch means coordinated thereto, and spring means engaging said clutch means, wherein the output gear means are output bevel gear wheels, each of which is operatively connected on the back side thereof by respective inclined surface means with a flange-like part, said flange-like part having a hub portion non-rotatably connected with the respective output shaft means, the spring means being cup springs arranged between the output bevel gear wheels and the spider means and pressing the output bevel gear wheels in a direction toward a respective flange-like part.

2. A differential gear according to claim 1, further comprising axially effective roller bearing means for supporting the cup springs against the spider means.

3. A differential gear according to claim 2, wherein the clutch means are conical friction clutches, each output gear means being provided at the external circumference with a conical surface for engagement against a corresponding counter surface formed in the housing means.

4. A differential gear according to claim 2, wherein the clutch means are lamellae friction clutches, said lamellae friction clutches being arranged between a respective flange-like part acting as abutment and against a pressure plate at the back side of the corresponding output gear means.

5. A defferential gear according to claim 4, wherein the pressure plate is formed by the back side of the respective output bevel gear wheel.

6. A differential gear according to claim 4, wherein the pressure plate is accommodated on the back side of the respective output bevel gear wheel.

7. A differential gear according to claim 1, wherein the clutch means are lamellae friction clutches, said lamellae friction clutches being arranged between a respective flange-like part acting as abutment and against a pressure plate at the back side of the corresponding output gear means.

8. A differential gear according to claim 1, wherein the clutch means are conical friction clutches, each output gear means being provided at the external circumference with a conical surface for engagement against a corresponding counter surface formed in the housing means.

9. A differential gear according to claim 1, wherein the inclined surface means are constructed as continuous sinusoidally-shaped curved surfaces.

10. A differential gear according to claim 1, wherein pocket-shaped recesses are provided at both parts consisting of the flange-like parts and the output gear means having roller body means therein which form the inclined surface means.

11. A differential gear according to claim 1, wherein the clutch means are lamellae friction clutches, said lamellae friction clutches being arranged between a respective flange-like part acting as abutment and against a pressure plate at the back side of the corresponding output gear means.

References Cited

UNITED STATES PATENTS

| 1,585,140 | 5/1926 | Erban | 74—798 |
|---|---|---|---|
| 1,750,981 | 3/1930 | Wildbaker | 74—711 |
| 1,921,406 | 8/1933 | Foust | 74—650 |
| 2,234,591 | 3/1941 | Fitzner | 74—711 |
| 2,821,096 | 1/1958 | Lyeth | 74—711 |
| 3,331,262 | 7/1967 | Mazziotti | 74—711 |
| 3,364,791 | 1/1968 | Truckle | 74—711 |

FOREIGN PATENTS 927,924   6/1963   Great Britain.

DONLEY J. STOCKING, Primary Examiner
THOMAS C. PERRY, Assistant Examiner